C. H. RAMSEY.
SPEED CHANGING UNIT.
APPLICATION FILED MAY 4, 1920.
1,393,906. Patented Oct. 18, 1921.
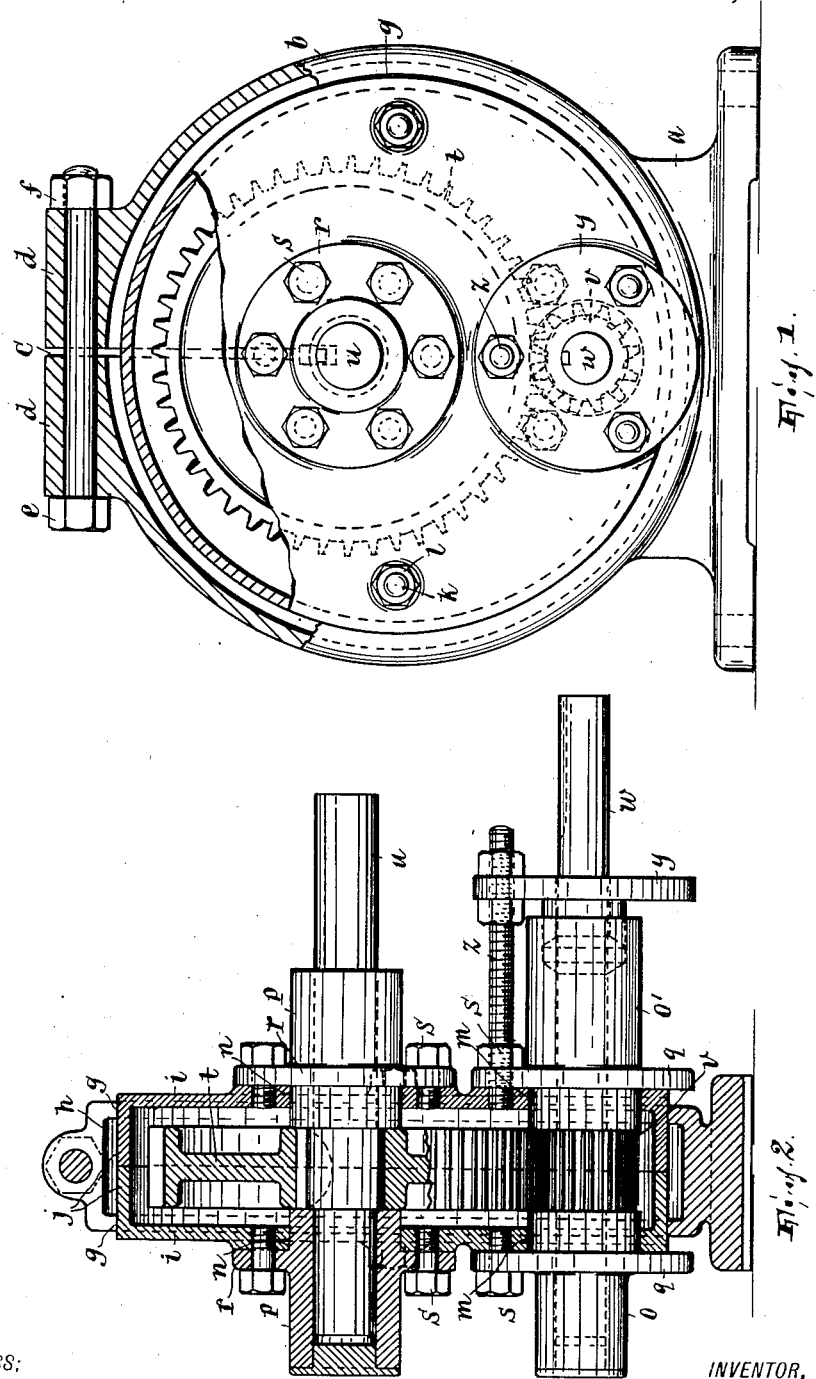
WITNESS:
Wm. Dzell
INVENTOR,
Clifford H. Ramsey,
BY
ATTORNEY.

UNITED STATES PATENT OFFICE.

CLIFFORD H. RAMSEY, OF GLEN ROCK, NEW JERSEY.

SPEED-CHANGING UNIT.

1,393,906. Specification of Letters Patent. Patented Oct. 18, 1921.

Application filed May 4, 1920. Serial No. 378,822.

*To all whom it may concern:*

Be it known that I, CLIFFORD H. RAMSEY, a citizen of the United States, residing at Glen Rock, in the county of Bergen and State of New Jersey, have invented certain new and useful Improvements in Speed-Changing Units, of which the following is a specification.

The object of this invention is to provide a simple and readily adjusted speed-changing unit that may be connected up with one or another of machines, as electric motors, which because they are of different types, makes or sizes have their power delivery or receiving shafts different distances from the floor or other basal plane.

In the drawing,

Figure 1 is a side elevation of my speed-changing unit, partly in section; and

Fig. 2 is a vertical sectional view thereof.

There is a support or stand including a base $a$, which may be fixed to a floor or other supporting surface, and integral with the base there is an upstanding band $b$ which is split, as at $c$, at the top and at the top has an enlargement or head $d$ divided by the split and adapted to receive a bolt $e$ having a nut $f$ and whereby the band may be contracted to exert clamping pressure on the box or carrier hereinafter referred to. The inner surface $g$ of the band is circular and forms a gripping surface; to increase the gripping action this gripping surface is preferably divided into two spaced narrow circumferential portions by grooving the band interiorly, as at $h$.

The box or carrier includes two counterpart disks $i$ each having at its periphery a marginal lateral flange $j$. The edges of the flanges of these disks are planed off parallel with the disks themselves so that when the flanged disks are assembled with their concave sides facing each other and so that they abut at the edges of said flanges and are concentric a substantially oil-tight space will be formed (Fig. 2). The disks may be held in this relation by bolts $k$ and nuts $l$ thereon. The box or carrier is provided with bearings for a speed-changing train of rotary gear elements one of which at least is eccentrically arranged in the carrier. In the present instance pairs of opposite holes are bored in the two disks, as at $m$ and $n$, both of these two pairs of holes being eccentrically arranged in the disks, and in these holes are fitted bearing members $o$ $o'$ and $p$ $p$ having flanges $q$ $r$ whereby, by means of screws $s$, to secure the bearing members to the disks.

The speed-changing train of gear elements herein illustrated includes a gear $t$ keyed on a shaft $u$, which is journaled in the bearing members $p$ $p$, and a pinion $v$ fixed on a shaft $w$ journaled in the bearing members $o$ $o'$.

It is designed in the present instance to have the gears $t$ and $v$ run in oil, the pinion $v$ being more or less submerged; to confine the oil the bearing member $o$ may be plugged, as at $x$, and the companion bearing member $o'$ provided with a gland $y$ held in place by screw means $z$ attached to the flange $q$ on said bearing member.

In the present example the shaft $w$ is adapted to be coupled with the shaft of a motor, whereas the shaft $u$ is adapted to be connected through a belt and pulley or other type of gearing with the shaft of the machine to be driven from the motor, one pulley or equivalent (not shown) being mounted on such shaft $u$.

The periphery of the box or carrier in the present case is circular and perfectly smooth and is of such diameter that when the bolt $e$ has been loosened it may be slipped into the band $b$ of the support or stand. Since shaft $w$ is eccentric with relation to the band, the box or carrier may be rotatively adjusted in the band to bring the shaft to the elevation necessary for coupling it to the shaft or motor, whereupon the box or carrier may be rigidly secured in the stand by tightening the bolt, and then the stand secured to the floor or equivalent.

The construction is such that the device as a whole is reversible and its various parts interchangeable. If desired, the power may be taken in at one side and delivered at the other, instead of being taken in and delivered at the same side, as is contemplated in the illustrated assembly of the parts.

The box or carrier is made in two parts or sections to permit the gears to be changed. The clamping action of the band $b$ trues up the two sections and consequently their bearings with reference to each other.

I do not wish to be limited to the precise construction herein shown and described, what I claim being—

1. In a power transmitting unit, transmission gears journaled on parallel axes, a carrier in which the gears are journaled, and a support for the carrier in which the carrier is rotatatively adjustable on an axis parallel with one of the first-named axes, said support having means to grip the carrier extending around the axis on which the carrier is adjustable and also extending around the gears.

2. In a power transmitting unit, a pair of separable disk-like members arranged face to face and together forming an inclosed and sealed lubricant receiving space, gearing revoluble in said space, and a support having means to clamp both disks peripherally and thereby hold them together.

3. In a power transmitting unit, a pair of disks arranged face to face and forming a gearing receiving space between them, gearing revoluble in said space, and a support including an annular gripping portion peripherally embracing and thereby gripping the disks.

4. In a power transmitting unit, a support including an annular gripping member, a carrier including a pair of substantially counterpart disks arranged face to face within and each held peripherally gripped by said member, said pair of disks having bearings, and transmission gearing journaled in said bearings between the disks.

In testimony whereof I affix my signature.

CLIFFORD H. RAMSEY.